US012019384B2

(12) United States Patent
Miyamoto

(10) Patent No.: US 12,019,384 B2
(45) Date of Patent: Jun. 25, 2024

(54) IMAGE FORMING APPARATUS THAT FIXES TONER IMAGE TO RECORDING MEDIUM USING HEATER

(71) Applicant: CANON KABUSHIKI KAISHA, Tokyo (JP)

(72) Inventor: Akitomo Miyamoto, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/867,899

(22) Filed: Jul. 19, 2022

(65) Prior Publication Data

US 2023/0023564 A1 Jan. 26, 2023

(30) Foreign Application Priority Data

Jul. 21, 2021 (JP) ................................ 2021-120809

(51) Int. Cl.
*G03G 15/20* (2006.01)

(52) U.S. Cl.
CPC ................................ *G03G 15/2039* (2013.01)

(58) Field of Classification Search
CPC ................................................ G03G 15/2039
See application file for complete search history.

(56) References Cited

U.S. PATENT DOCUMENTS 5,329,343 A 7/1994 Saito
5,512,993 A 4/1996 Endo et al.
6,301,454 B1 10/2001 Nishida et al.
6,654,572 B2 11/2003 Kataoka
6,900,419 B2 5/2005 Takagi et al.
10,139,759 B2 11/2018 Tamaki
2002/0085852 A1 7/2002 Kataoka
2005/0013622 A1 1/2005 Omoto et al.
2008/0069584 A1* 3/2008 Sanada .............. G03G 15/5004 399/88
2010/0028037 A1 2/2010 Song
2010/0061754 A1 3/2010 Ishigaya et al.
2010/0178072 A1* 7/2010 Hwang .............. G03G 15/2039 399/69
2011/0142475 A1 6/2011 Kim
2012/0237248 A1* 9/2012 Aoki .................. G03G 15/2039 399/88

(Continued)

FOREIGN PATENT DOCUMENTS

CN 1497392 A 5/2004
JP 2000-243537 A 9/2000

(Continued)

OTHER PUBLICATIONS

Extended European Search Report issued Dec. 20, 2022 in counterpart European Patent Appln. No. 22183502.8.

(Continued)

*Primary Examiner* — Stephanie E Bloss
*Assistant Examiner* — Michael A Harrison
(74) *Attorney, Agent, or Firm* — Venable LLP

(57) ABSTRACT

A controller obtains a first duty cycle of a first current to be supplied to a first heater and a second duty cycle of a second current to be supplied to a second heater and controls the first switch and the second switch after the reduction control period, such that the temperature of a fixing unit maintains a target temperature for fixing the image by the fixing unit.

9 Claims, 9 Drawing Sheets

(56) References Cited

U.S. PATENT DOCUMENTS

| | | | |
|---|---|---|---|
| 2016/0357135 | A1 | 12/2016 | Yamamoto |
| 2018/0253040 | A1 | 9/2018 | Tamaki |
| 2021/0200125 | A1 | 7/2021 | Harada |
| 2021/0278794 | A1 | 9/2021 | Nakajima |
| 2023/0023564 | A1 | 1/2023 | Miyamoto |
| 2023/0251593 | A1 | 8/2023 | Uehara |

FOREIGN PATENT DOCUMENTS

| | | | |
|---|---|---|---|
| JP | 2002182520 | A | 6/2002 |
| JP | 2010096969 | A | 4/2010 |
| JP | 4980165 | B2 | 7/2012 |
| JP | 5133015 | B | 1/2013 |
| JP | 2017021173 | A | 1/2017 |
| JP | 2018146712 | A | 9/2018 |
| JP | 2020-052247 | A | 4/2020 |
| JP | 2021-056274 | A | 4/2021 |

OTHER PUBLICATIONS

Co-pending U.S. Appl. No. 17/867,878, filed Jul. 19, 2022.
Co-pending U.S. Appl. No. 17/867,912, filed Jul. 19, 2022.

* cited by examiner

IMAGE FORMING APPARATUS THAT FIXES TONER IMAGE TO RECORDING MEDIUM USING HEATER

BACKGROUND OF THE INVENTION

Field of the Invention

The present disclosure relates to an image forming apparatus that fixes a toner image to a recording medium using a heater.

Description of the Related Art

A fixing device uses a plurality of heaters to apply heat to a toner image and a sheet to fix the toner image onto the sheet. Japanese Patent Laid-Open No. 2017-021173 discloses a fixing device employing a halogen heater. Inrush current flows in halogen heaters when such heaters are started up, and thus the supply voltage of the AC power source may drop, producing what is known as a “flicker phenomenon”. “Flicker phenomenon” refers to a phenomenon in which the operations of other devices connected to an AC power source are affected by fluctuations in the AC power source voltage caused by inrush current and the like occurring in electrical devices connected to the AC power source. Flickering of lighting devices can be given as a typical example of the flicker phenomenon. Japanese Patent Laid-Open No. 2002-182520 proposes reducing flicker by gradually increasing an energization angle (energization time per half cycle of AC) of AC voltage applied to a halogen heater during a start-up period of the halogen heater.

Incidentally, the voltage (nominal voltage) of commercial AC power sources may vary from country to country or from region to region within the same country. Furthermore, multiple commercial AC power sources of different voltages may be provided within the same region. Some commercial power sources can provide stable AC voltage with small fluctuations relative to the nominal voltage, while commercial power sources provide AC voltage with large fluctuations relative to the nominal voltage. For example, there are regions where the effective value of the AC voltage supplied by commercial power sources can fluctuate significantly, between +10% and −10%. Furthermore, for a nominal voltage of 220 V, there are areas where the effective value actually fluctuates in the range of 180 V to 270 V. Under such power source conditions, if the energization angle in the start-up period or the length of the start-up period is fixed to match an AC voltage having a high effective value, the heating time of a heater will increase when an AC voltage having a low effective value is applied. Conversely, if the energization angle in the start-up period or the length of the start-up period is fixed to match an AC voltage having a low effective value, the effect of reducing flicker when AC voltage having a high effective value is applied will be insufficient.

SUMMARY OF THE INVENTION

The embodiment of the disclosure provides an image forming apparatus comprising, an image forming unit configured to form an image on a sheet; a fixing unit configured to fix the image to the sheet, the fixing unit including: a first heater to which a first current is supplied from a first commercial power source to generate heat; a first switch provided in a current line between the first commercial power source and the first heater and configured to switch whether or not to supply the first current to the first heater; a second heater to which a second current is supplied from a second commercial power source to generate heat, the second commercial power source being different from the first commercial power source; a second switch provided in a current line between the second commercial power source and the second heater and configured to switch whether or not to supply the second current to the second heater; and a temperature sensor configured to detect a temperature of the fixing unit; and a controller configured to: obtain information related to a first AC voltage supplied from the first commercial power source; obtain information related to a second AC voltage supplied from the second commercial power source; determine, based on the information related to the first AC voltage, a first duty cycle of the first current to be supplied to the first heater; determine, based on the information related to the second AC voltage, a second duty cycle of the second current to be supplied to the second heater; control the first switch based on the first duty cycle in a reduction control period; control the second switch based on the second duty cycle in the reduction control period; and control the first switch and the second switch after the reduction control period, such that the temperature of the fixing unit detected by the sensor maintains a target temperature for fixing the image by the fixing unit.

Further features of the present invention will become apparent from the following description of exemplary embodiments (with reference to the attached drawings).

DESCRIPTION OF THE EMBODIMENTS

Figure 1:
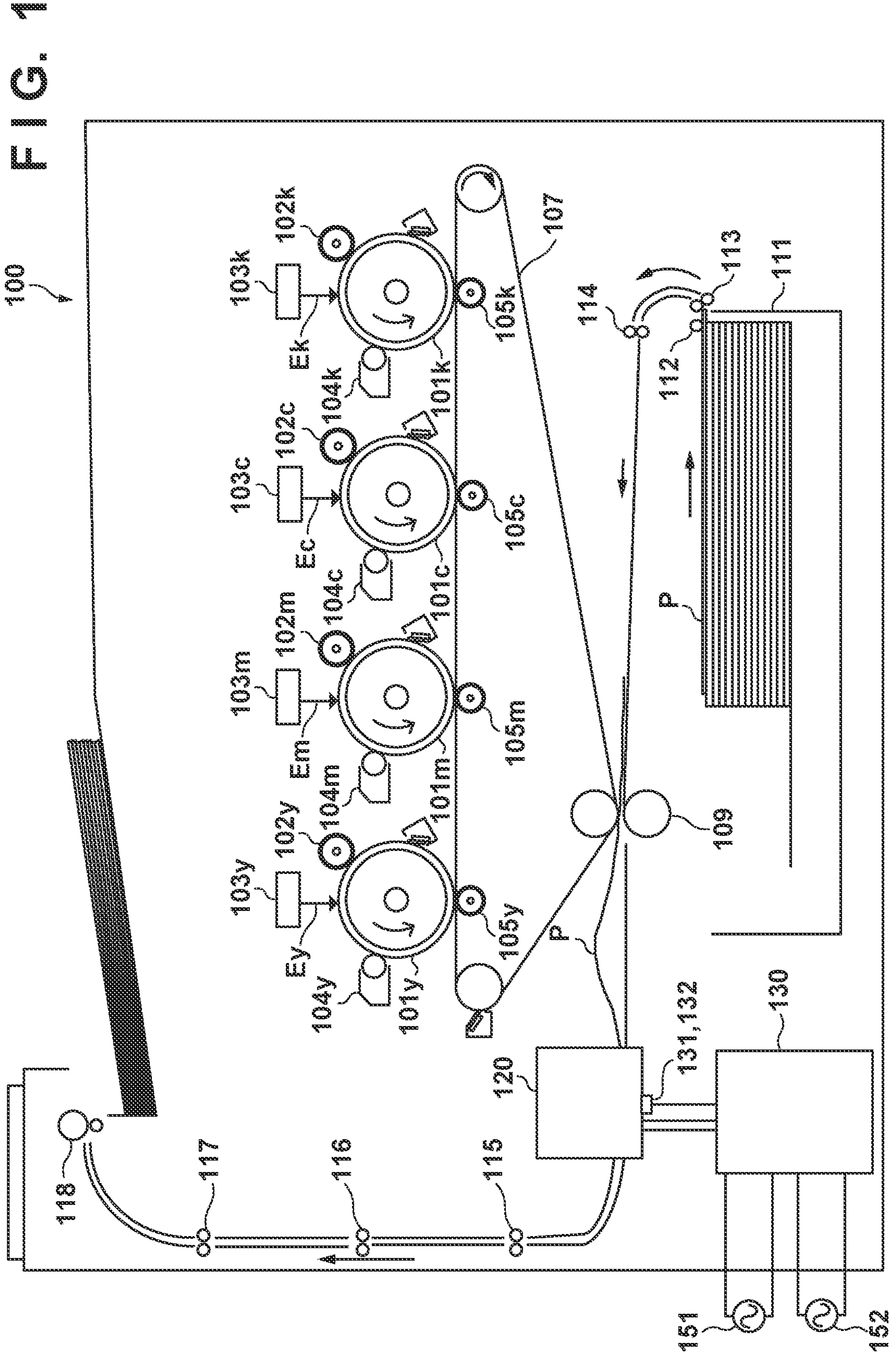
FIG. 1 is a schematic diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus

As illustrated in FIG. 1, an image forming apparatus 100 is an electrophotographic printer having four image forming stations. The image forming apparatus 100 may be commercialized as a copier, a multifunction peripheral, a facsimile device, or the like. Here, the first station forms a yellow “y”

image. The second station forms a magenta “m” image. The third station forms a cyan “c” image. The fourth station forms a black “k” image. The operations and configuration of the four stations are identical or similar. Therefore, when matters common to all four colors are described, the letters y, m, c, and k will be omitted from the reference signs. The technical spirit of the present invention is also applicable to monochrome printers.

A photosensitive drum 101 is a rotating photosensitive member and image carrier that carries an electrostatic latent image and a toner image. A charging roller 102 is a charging member that uniformly charges the surface of the photosensitive drum 101. An exposure unit 103 emits a laser beam E according to an image signal to the photosensitive drum 101 and forms an electrostatic latent image on the surface of the photosensitive drum 101. A developer 104 adheres toner to the electrostatic latent image to form the toner image. A primary transfer roller 105 transfers the toner image from the photosensitive drum 101 to an intermediate transfer belt 107. That is, a full-color image is formed by transferring a yellow toner image, a magenta toner image, a cyan toner image, and a black toner image in order to the intermediate transfer belt 107. When the intermediate transfer belt 107 rotates, the toner image is transported to a secondary transfer part. A secondary transfer roller pair 109 is provided at the secondary transfer part.

A sheet cassette 111 is a sheet holder that can accommodate a large number of sheets P. A pickup roller 112 feeds a sheet P from the sheet cassette 111 to a transport path. A sheet feed roller 113 transports the sheet P downstream while suppressing overlapping transport of the sheets P. “Downstream” refers to being downstream in a transport direction of the sheets P. A resist roller 114 is a transport roller that reduces skew of the sheet P. The leading edge of the sheet P in the transport direction of the sheet P is pushed against the resist roller 114, which corrects skew in the sheet P. The sheet P is then transported to the secondary transfer part.

At the secondary transfer part, the secondary transfer roller pair 109 transfers the toner image from the intermediate transfer belt 107 to the sheet P. A fixing device 120 fixes the toner image to the sheet P by applying heat and pressure to the sheet P and the toner image. Transport rollers 115, 116, and 117 are disposed downstream from the fixing device 120 and transport the sheet P to a discharge roller 118. The discharge roller 118 is used to transport the sheet P to the exterior of the image forming apparatus 100 (e.g., a sheet tray).

A control board 130 supplies AC supplied from a first commercial power source 151 and AC supplied from a second commercial power source 152 to the fixing device 120 and controls the temperature of the fixing device 120. A temperature sensor 131, which detects a temperature in a central region in the direction in which the fixing device 120 extends (from the front to the back of the diagram in FIG. 1), and a temperature sensor 132, which detects a temperature in an end region, are provided. In this manner, by receiving power from a plurality of different commercial power sources, the temperature of the fixing device 120 can be raised to a target temperature in a short time. Furthermore, compared to a case where a single power supply system is used, inrush current is distributed in the case where a plurality of power supply systems are used, and thus inrush current is reduced, which reduces flicker.

Fixing Device

Figure 2:
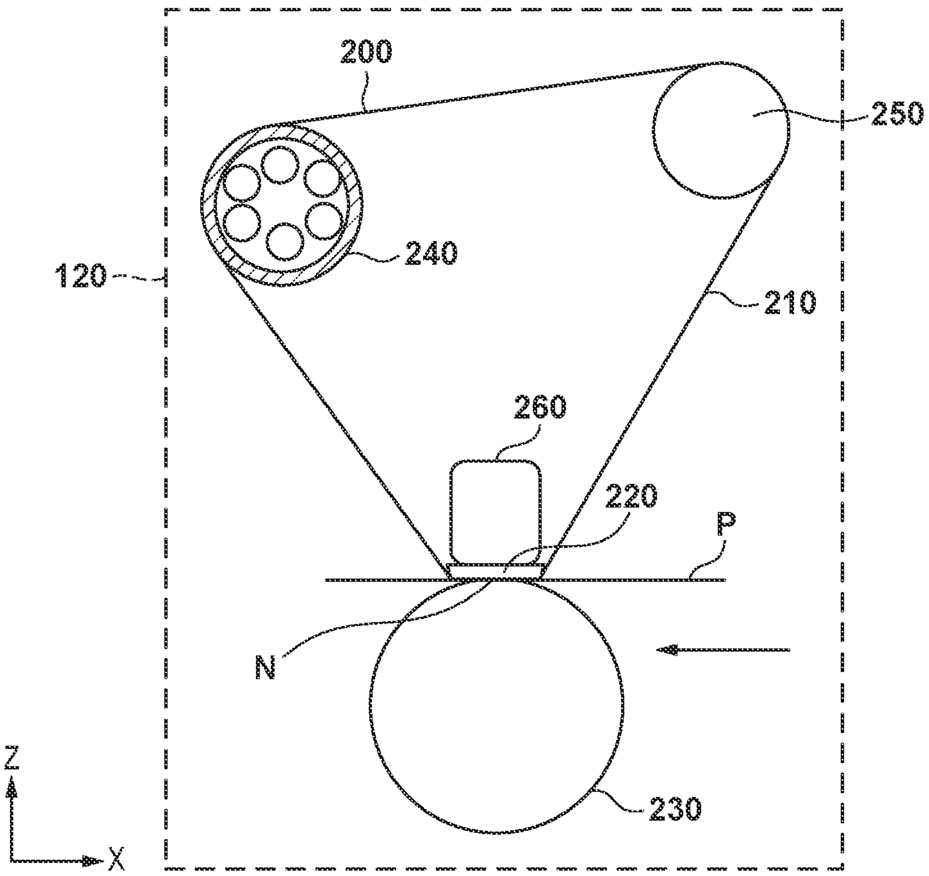
FIG. 2 is a schematic diagram illustrating a fixing device.

As illustrated in FIG. 2, the fixing device 120 has a heating unit 200 centered on a rotatable endless fixing belt 210 that serves as a heat conduction medium. In FIG. 2, the Z direction is the height direction, and the X direction is parallel to the transport direction of the sheets P. The fixing belt 210 is stretched over a pad 220, a heating roller 240, and a tension roller 250. The heating roller 240 is a heating rotating body that contains a heater (e.g., a halogen heater). A halogen heater is a heater having a halogen lamp as a heating element. The heating roller 240 heats the fixing belt 210. The heating roller 240 is rotated by rotational power supplied from a motor or the like. The tension roller 250 is a tension roller that applies a predetermined tension to the fixing belt 210. The tension roller 250 is biased by an elastic body (e.g., a spring) supported by a frame (not shown) of the heating unit 200. The tension of this spring is, for example, 50 N. The tension roller 250 rotates driven by the fixing belt 210. The pad 220 supports an inner circumferential surface of the fixing belt 210 by a metal stay 260. Together with a pressure roller 230, the pad 220 sandwiches the fixing belt 210. What is known as a substantially flat nip part N is formed between the pad 220 and the pressure roller 230. At least one of the pressure roller 230 or the pad 220 may be biased by a biasing mechanism (not shown) such that the nip part N is formed at a predetermined length and width. Pressure and heat are applied to the sheet P and the toner image as the sheet P, to which the toner image has been transferred, passes through the nip part N. As a result, the toner image is fixed onto the sheet P.

The fixing belt 210 has thermal conductivity and heat resistance. The fixing belt 210 has a thin-walled cylindrical shape, the inner diameter of which is, for example, 120 mm. The fixing belt 210 may employ a three-layer structure having a base layer, an elastic layer provided on the outer circumference of the base layer, and a release layer provided on the outer circumference of the elastic layer. The thickness of the base layer is, for example, 60 μm. The material of the base layer is, for example, polyimide resin (PI). The thickness of the elastic layer is, for example, 300 μm. The material of the base layer is, for example, silicone rubber. The thickness of the release layer is, for example, 30 μm. The material of the release layer is, for example, fluorine resin. For example, PFA (polyfluoroethylene tetrafluoride/perfluoroalkoxyethylene copolymerization resin) can be used as the fluorine resin.

The material of the pad 220 is, for example, LCP (liquid crystal polymer) resin. The heating roller 240 may be a stainless steel pipe. The outer diameter of the pipe may be, for example, 40 mm. The thickness of the pipe may be, for example, 1 mm. A plurality of (e.g., six) heaters may be provided inside the pipe. The heat supplied by the heaters is conducted from the heating roller 240 to the fixing belt 210, and then from the fixing belt 210 to the sheet P and the toner image. The tension roller 250 may also be formed as a stainless steel pipe. The outer diameter of the pipe is, for example, 40 mm. The thickness of the pipe is, for example, 1 mm. The ends of the pipe may be rotatably supported by bearings (not shown).

The pressure roller 230 is, for example, a roller having an elastic layer and a release layer. The elastic layer is provided around the outer circumference of the rotating shaft of the pressure roller 230. Furthermore, the release layer is provided around the outer circumference of the elastic layer. The material of the rotating shaft may be metal (e.g., stainless steel). The thickness of the elastic layer is, for example, 5 mm. The material of the elastic layer is, for example, conductive silicone rubber. The thickness of the release layer is, for example, 50 μm. The material of the release layer is, for example, fluorine resin such as PFA.

Controller

Figure 3:
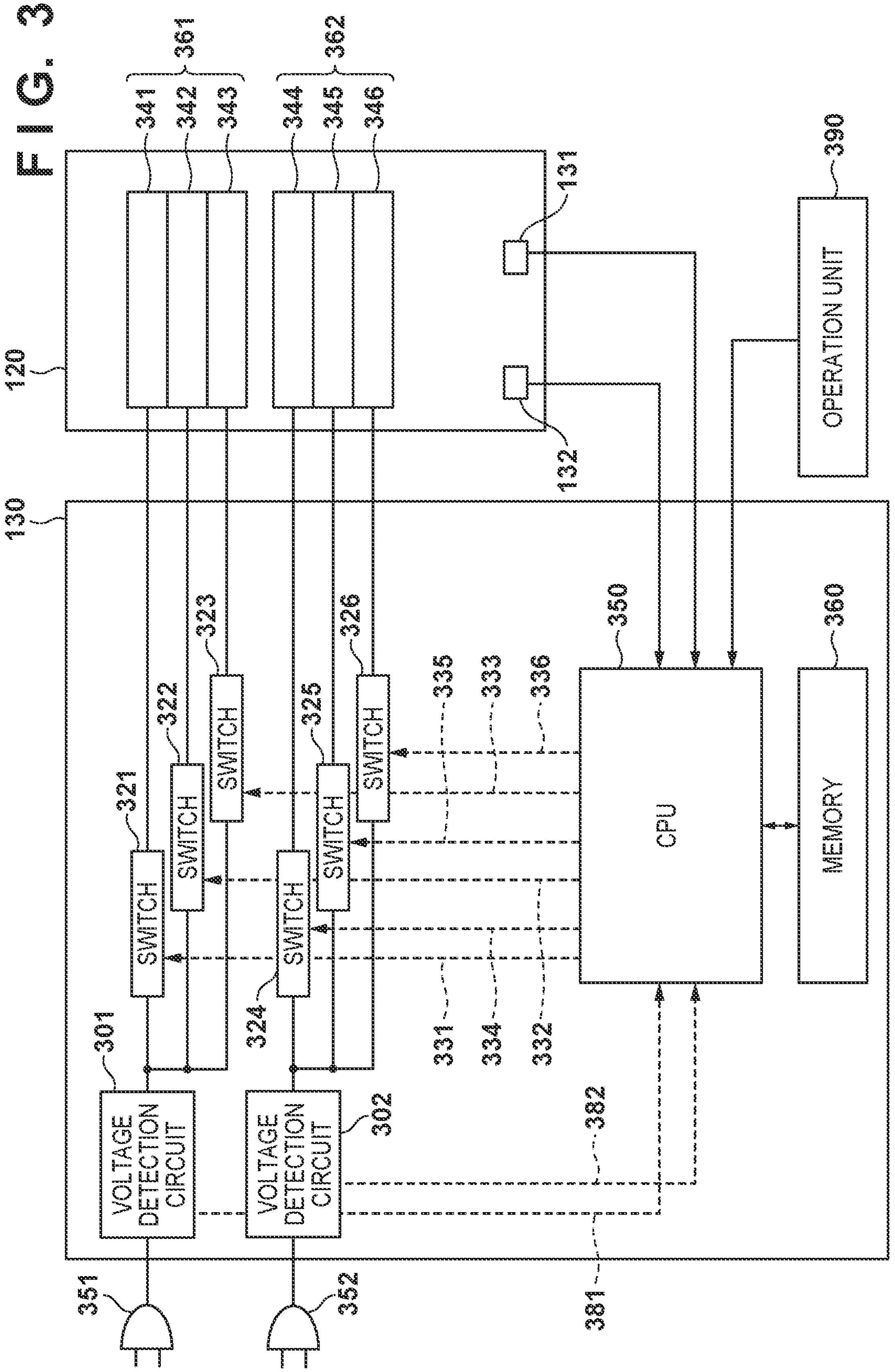
FIG. 3 is a diagram illustrating a controller.

As illustrated in FIG. 3, the control board 130 is a controller that drives heaters 341 to 346. A power cord 351 is connected to the first commercial power source 151. A power cord 352 is connected to the second commercial power source 152. The AC power supplied from the power cord 351 is supplied to a first heater group 361 via a first power system 311. The AC power supplied from the power cord 352 is supplied to a second heater group 362 via a second power system 312. The first heater group 361 includes the heaters 341, 342, and 343. The second heater group 362 includes the heaters 344, 345, and 346.

The control board 130 is provided with a CPU 350 and a plurality of switches 321 to 326. The CPU 350 controls the plurality of switches 321 to 326 according to a control program stored in memory 360. The memory 360 can include non-volatile memory (ROM), volatile memory (RAM), solid state drives (SSD), and hard disk drives (HDD).

The switch 321 is connected between the power cord 351 and the heater 341, and turns the heater 341 on/off according to a control signal 331 from the CPU 350. The switch 322 is connected between the power cord 351 and the heater 342, and turns the heater 342 on/off according to a control signal 332 from the CPU 350. The switch 323 is connected between the power cord 351 and the heater 343, and turns the heater 343 on/off according to a control signal 333 from the CPU 350. The switch 324 is connected between the power cord 352 and the heater 344, and turns the heater 344 on/off according to a control signal 334 from the CPU 350. The switch 325 is connected between the power cord 352 and the heater 345, and turns the heater 345 on/off according to a control signal 335 from the CPU 350. The switch 326 is connected between the power cord 352 and the heater 346, and turns the heater 346 on/off according to a control signal 336 from the CPU 350. The switches 321 to 326 may be switching elements such as triacs, thyristors, transistors, and insulated gate bipolar transistors (IGBTs), for example. However, any switch elements can be employed as the switches 321 to 326 as long as the switches can be controlled from the CPU 350 and have performance (rated voltage and rated current) commensurate with the power consumption of the heaters 341 to 346.

The CPU 350 detects a central temperature M of the heating roller 240 based on a detection signal output from the temperature sensor 131. The CPU 350 detects an end temperature R of the heating roller 240 based on a detection signal output from the temperature sensor 132. The CPU 350 determines the respective operating ratios (duty ratios) of the heaters 341 to 346 based on these temperatures. The CPU 350 outputs the control signals 331 to 336 according to the duty ratio of the heaters 341 to 346, respectively. The duty ratio determination may be made, for example, every set period (e.g., 10 seconds).

A voltage detection circuit 301 detects the voltage of the first commercial power source 151 and outputs a detection result to the CPU 350. A voltage detection circuit 302 detects the voltage of the second commercial power source 152 and outputs a detection result to the CPU 350. The voltage detection circuits 301 and 302 may be implemented by voltage divider circuits that output a detection voltage proportional to the AC voltage by dividing the AC voltage. The CPU 350 determines a duty cycle of the first heater group 361 during the start-up period thereof based on the detection result of the first commercial power source 151. Here, "duty cycle" refers to the energization time (energization angle) in a half cycle of AC. The "energization angle" is an angle from an energization start phase to an energization end phase in a half cycle of AC. The "duty ratio" is the ratio of the energization time t0 the half cycle, and may be expressed as the percentage of the energization time occupying the half cycle. The start-up period is a period during which control for reducing inrush current, and in turn reducing flicker, is executed, and may therefore be referred to as an inrush current or flicker reduction control period. The voltage detection circuits 301 and 302 may detect zero-crosses of AC voltage, generate a zero-cross signal, and output the signal to the CPU 350. "Zero cross" refers to a change in the sign (positive or negative) of the AC voltage.

An operation unit 390 includes a display device that outputs information to the user and an input device that accepts input from the user. The CPU 350 may obtain information indicating the nominal voltage (or effective value) of the first commercial power source 151 and the nominal voltage (or effective value) of the second commercial power source 152 from the user via the operation unit 390. Note that the effective value may deviate from the nominal voltage. This deviation may occur in the long term or in the short term, depending on the power source conditions in each country and each region. Therefore, the duty cycle of the first heater group 361 and the duty cycle of the second heater group 362 are determined according to the effective value (or a maximum value) detected by the voltage detection circuits 301 and 302. This provides even more precise reduction control.

Heat Distribution Characteristics (Heat Generation Capacity) of Heater

Figure 4B:
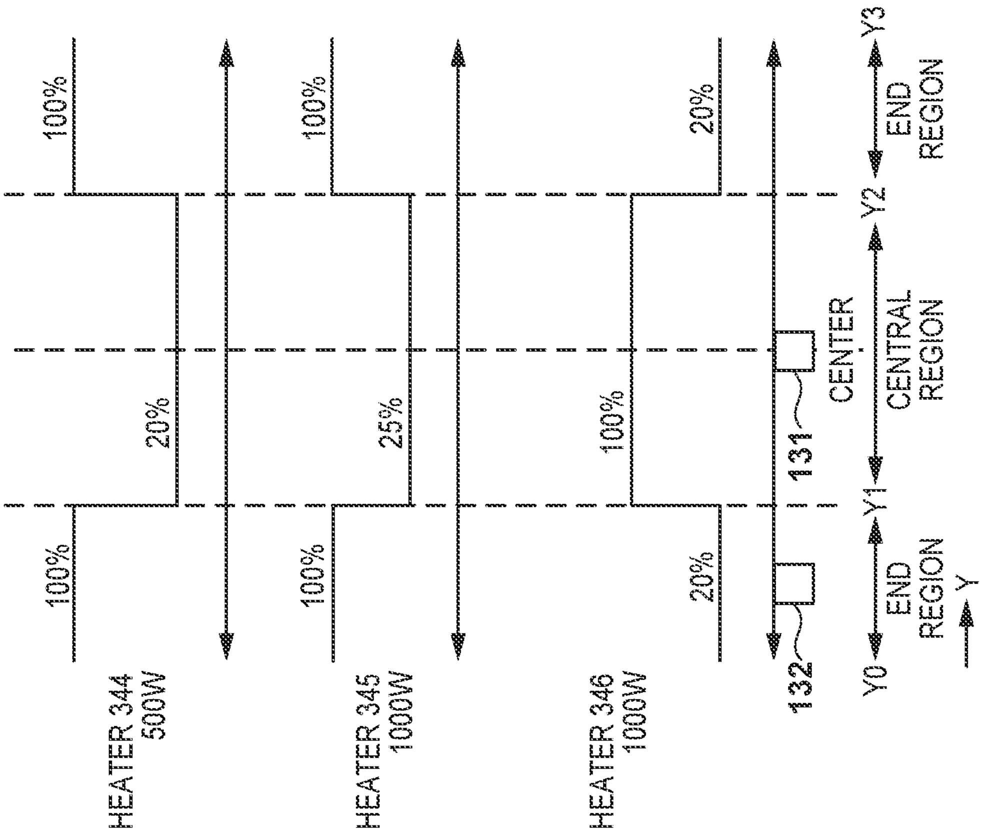
FIGS. 4A and 4B are diagrams illustrating the heat generation capacity of a heater.
Figure 4A:
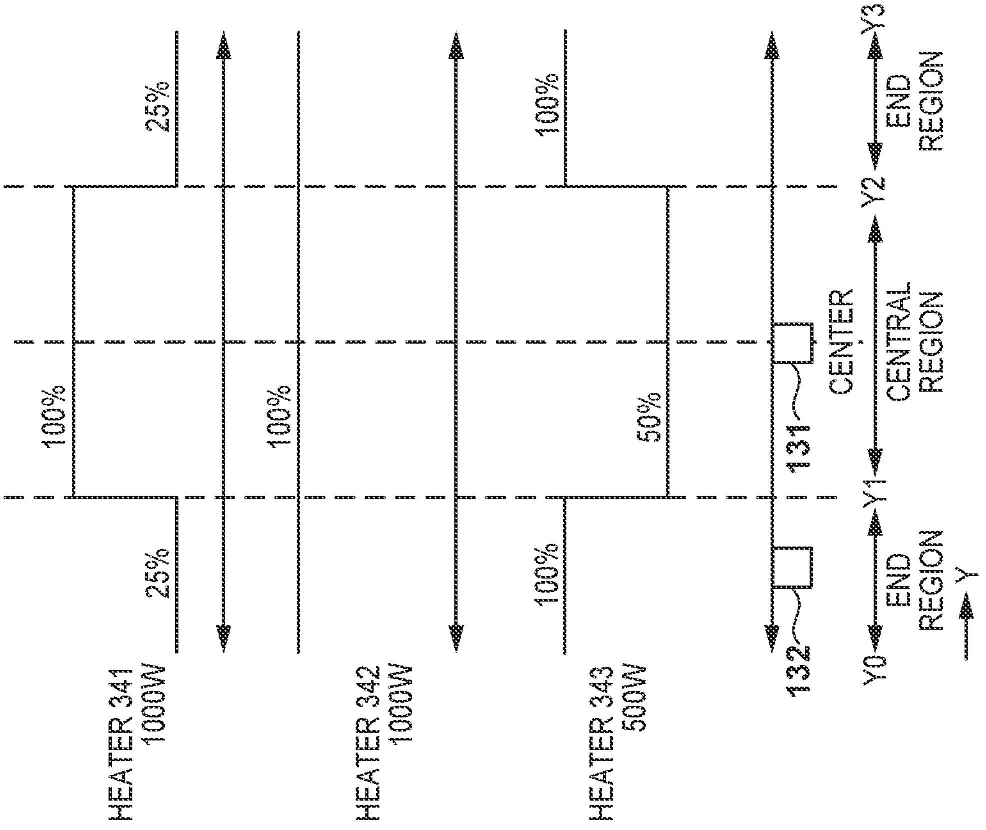

FIG. 4A illustrates the heat distribution characteristics (heat generation capacity distribution) of the three heaters 341, 342, and 343, which form the first heater group 361. FIG. 4B illustrates the heat distribution characteristics of the three heaters 344, 345, and 346, which form the second heater group 362. The horizontal axis represents a position in the Y direction. The vertical axis represents the heat generation capacity. As illustrated in FIGS. 4A and 4B, each of the six heaters 341 to 346 may have different heat distribution characteristics. The CPU 350, for example, selects one or more heaters from the six heaters 341 to 346 according to the size and grammage of the sheet P.

Y0 indicates the position of one end of the heaters 341 to 346 (hereinafter referred to as a "left end"). Y3 indicates the position of the other end of the heaters 341 to 346 (hereinafter referred to as a "right end"). Y1 is a boundary between an end region at the left end and a central region. Y2 is a boundary between an end region at the right end and the central region. The length from Y0 to Y3 is, for example, 500 mm. The distance from Y0 to Y1 is, for example, 125 mm. The distance from Y0 to Y2 is, for example, 375 mm. In other words, the distance from Y1 to Y2 is 250 mm. Thus, the ratio of the length of one end region to the length of the central region may be 1:2.

The heater 341 and the heater 346 are the heat sources that primarily heat the central region of the heating roller 240. The heater 343, the heater 344, and the heater 345 are the heat sources that primarily heat the two end regions of the heating roller 240. The heater 342 is a heat source that heats the entire area of the heating roller 240, including the central region and the end regions, almost uniformly.

The power consumption (heater output) of each of the heaters 341, 342, 345, and 346 is, for example, 1000 W. The power consumption (heater output) of each of the heaters 343 and 344 is, for example, 500 W. Incidentally, the center of sheet P is transported so as to pass near the center in the Y direction, regardless of the width of the sheet P. For example, when a sheet P having a narrower length in the Y direction (width) is continuously transported, the duty cycle of the heaters 343, 344, and 345, which mainly heat the end regions, is reduced. This prevents excessive heat buildup in both end regions of the heating roller 240.

As illustrated in FIGS. 4A and 4B, the temperature sensor 131 is disposed in the center of the central region. The temperature sensor 132 is disposed in the center of the end region on the left side. In particular, the temperature sensors 131 and 132 are disposed so as not to overlap Y1 and Y2, such that the temperature in the central region (a central temperature M) and the temperature in the end regions (an end temperature R) are accurately detected.

The ratio of the heat generation capacity of the central region of the heater 341 is X %. The ratio of the heat generation capacity of the end region of the heater 341 is Y % (X>Y). Here, the power consumption of heater 341 is assumed to be 1000 W. Accordingly, the heat generation capacity of one end region of the heater 341 is a power equivalent of 100 W. The heat generation capacity of the central region of the heater 341 is a power equivalent of 800 W. For the remaining heaters 342 to 346, the heat generation capacity of each region can be calculated from the ratios and power consumptions indicated in FIG. 4A or FIG. 4B.

Flicker Reduction

Figures 5A, 5B, 5C, 5D:
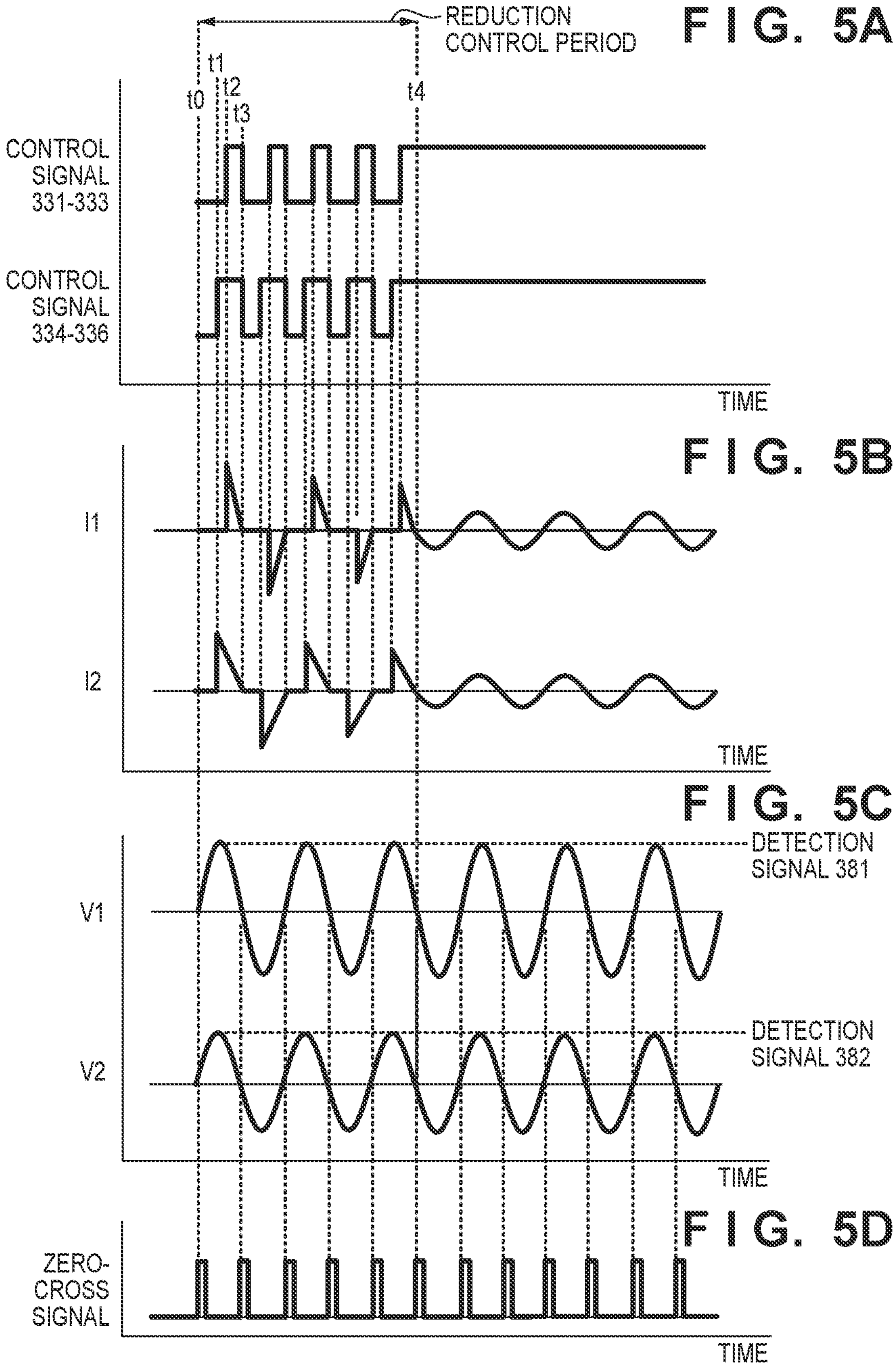
FIGS. 5A to 5D are diagrams illustrating flicker reduction control.

FIG. 5A illustrates changes in the control signals 331 to 336. FIG. 5B illustrates changes in input current I1 from the first commercial power source 151 and changes in input current I2 from the second commercial power source 152. FIG. 5C illustrates changes in input voltage V1 from the first commercial power source 151 and changes in input voltage V2 from the second commercial power source 152. Here, a maximum value of the input voltage V1 (the AC voltage of the first commercial power source 151) is greater than a maximum value of the input voltage V2 (the AC voltage of the second commercial power source 152). In other words, the nominal voltage (effective value) of the first commercial power source 151 is higher than the nominal voltage (effective value) voltage of the second commercial power source 152. FIG. 5D illustrates the zero-cross signals for the first commercial power source 151 and the second commercial power source 152. Here, to simplify the descriptions, only one zero-cross signal is illustrated for the first commercial power source 151 and the second commercial power source 152. However, the zero-cross signal of the first commercial power source 151 may be different from the zero-cross signal of the second commercial power source 152. The period from time t0 to time t3 corresponds to a half cycle of AC.

Time t0 is the timing when the CPU 350 starts temperature control of the fixing device 120. The period from time t0 to time t4 is the inrush current and flicker reduction control period. Heaters in which the resistance value varies depending on the temperature, such as halogen heaters, for example, may be employed as the heaters 341 to 346. In this case, if the temperature of the heaters 341 to 346 is low, the resistance value of the heaters 341 to 346 will also be low, and thus inrush current easily flows in the heaters 341 to 346. Furthermore, as the input voltage rises, so too does the inrush current. Accordingly, the CPU 350 determines the duty cycle for the first heater group 361 during the reduction control period based on the detection result of the input voltage V1 (a detection signal 381). Similarly, the CPU 350 determines the duty cycle for the second heater group 362 during the reduction control period based on the detection result of the input voltage V2 (a detection signal 382).

According to FIG. 5C, the input voltage V1 is higher than the input voltage V2. Therefore, as illustrated in FIG. 5A, the duty cycle of the first heater group 361 (the time from time t2 to time t3) is shorter than the duty cycle of the second heater group 362 (the time from time t1 to time t3). In this manner, the CPU 350 determines the duty cycle (energization time per half cycle or energization angle) during the reduction control period according to the nominal voltage (effective value) of the AC power source. This makes it possible to achieve efficient heating while reducing flicker according to the effective value of the AC voltage. In other words, the heating time required to raise the temperature of the fixing device 120 to the target temperature is reduced.

The reduction control will be described in detail here. Here, it is assumed that the detection results of the input voltages V1 and V2 are finalized at a timing prior to time t0. In other words, it is assumed that the CPU 350 determines the duty cycle of the first heater group 361 and the duty cycle of the second heater group 362, and stores the duty cycles in the memory 360.

At time t0, the CPU 350 detects the rising edge of the zero-cross signal. The CPU 350 obtains the duty cycle of the first heater group 361 and the duty cycle of the second heater group 362 from the memory 360, and determines time t1 and time t2. During the period from time t1 to time t3, the CPU 350 supplies power to the second heater group 362. During the period from time t2 to time 3, the CPU 350 supplies power to the first heater group 361. In this manner, the period from the rising edge of the preceding zero-cross signal to the rising edge of the following zero-cross signal is one control cycle. The energization start timing during one control cycle is controlled by the CPU 350. In other words, the CPU 350 controls the timing at which each of the plurality of switches 321 to 326 turns on during a single control cycle. Here, the rising edge of the following zero-cross signal is an energization end timing. As illustrated in FIG. 5A, a plurality of control cycles are repeated during the reduction control period.

The duty cycle is constant in each control cycle. However, as illustrated in FIG. 5B, the inrush current gradually decreases. This is because as the temperature of each of the heaters 341 to 346 gradually increases, the resistance value of each of the heaters 341 to 346 also gradually increases.

The control mode of the heaters 341 to 346 applied during the reduction control period may be referred to as a "reduction control mode". When the reduction control period of a predetermined time ends, the CPU 350 shifts the control mode of the fixing device 120 from the reduction control mode to a temperature control mode. In the temperature control mode, the duty cycle is adjusted based on the detection result of the temperature of the fixing device 120. The CPU 350 controls the plurality of switches 321 to 326 such that the temperature of the fixing device 120 maintains a target temperature at which the fixing device 120 is capable of fixing images. This keeps the temperature of the fixing device 120 at the target temperature.

CPU Functions

Figure 6:
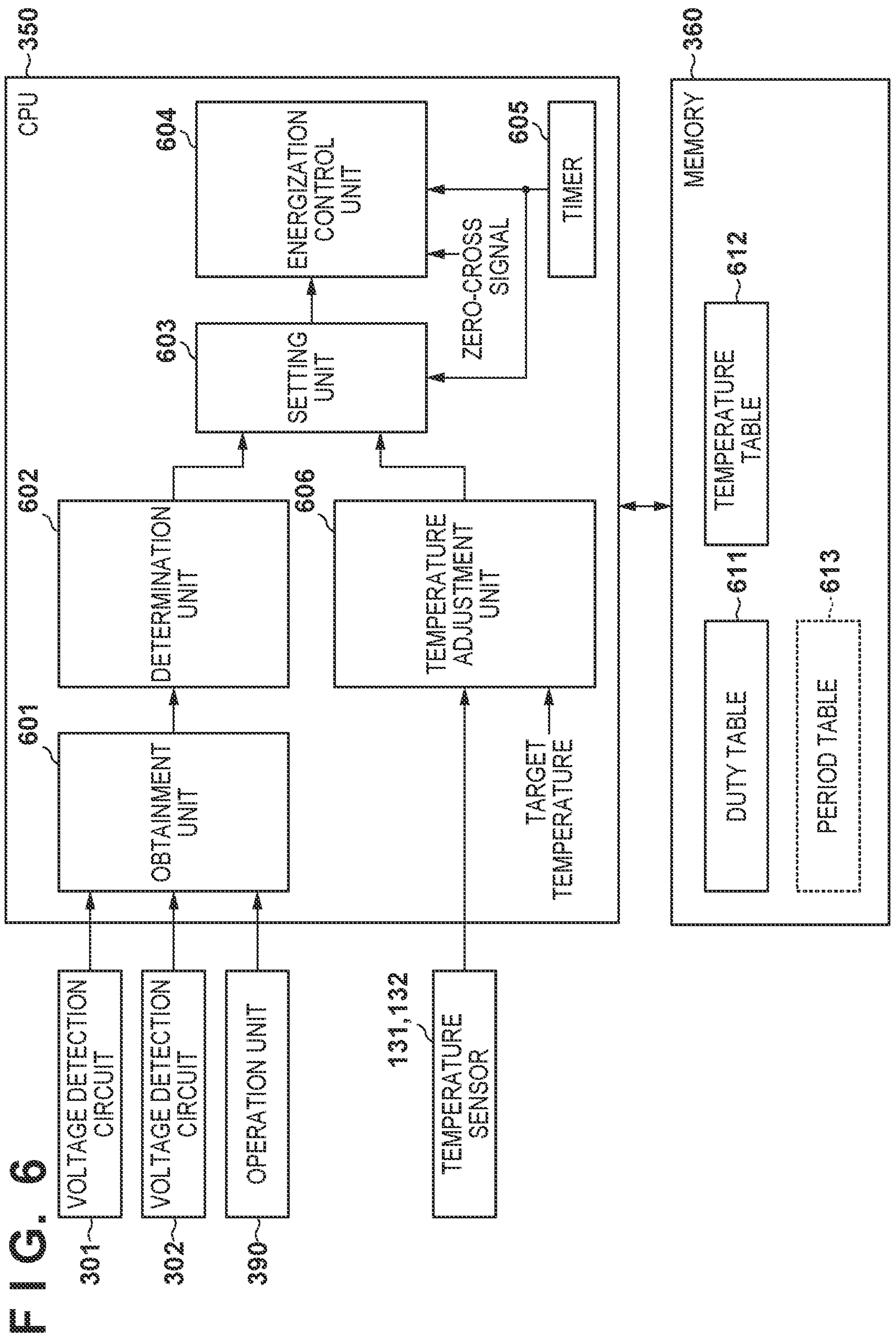
FIG. 6 is a diagram illustrating functions of a CPU.

FIG. 6 illustrates functions realized by the CPU 350 executing a control program. An obtainment unit 601 obtains, from the voltage detection circuit 301, the detection result (the maximum value) of the AC voltage supplied from the first commercial power source 151. The obtainment unit 601 may determine the effective value of the AC voltage or the nominal voltage of the first commercial power source 151 from the detection result. The obtainment unit 601 obtains, from the voltage detection circuit 302, the detection result (the maximum value) of the AC voltage supplied from the second commercial power source 152. The obtainment unit 601 may determine the effective value of the AC voltage or the nominal voltage of the second commercial power source 152 from this detection result. Alternatively, the obtainment unit 601 may accept a user input, from the operation unit 390, of the nominal AC voltage of the first commercial power source 151 and the nominal AC voltage of the second commercial power source 152.

A determination unit 602 determines the duty cycle applied to the first heater group 361 during the reduction control period based on the AC voltage (the maximum value, the effective value, or the nominal voltage) of the first commercial power source 151. The determination unit 602 determines the duty cycle applied to the second heater group 362 during the reduction control period based on the AC voltage (the maximum value, the effective value, or the nominal voltage) of the second commercial power source 152. During the reduction control period, a setting unit 603 sets the duty cycle determined by the determination unit 602 in an energization control unit 604. The energization control unit 604 executes energization control for the heaters 341 to 346 based on the rising edge of the zero-cross signal. Because the heaters 341 to 343 are supplied with power from the first commercial power source 151, a duty cycle corresponding to the AC voltage of the first commercial power source 151 is applied to the heaters 341 to 343. Likewise, because the heaters 344 to 346 are supplied with power from the second commercial power source 152, a duty cycle corresponding to the AC voltage of the second commercial power source 152 is applied to the heaters 344 to 346.

When the reduction control period ends, the CPU 350 starts temperature control. During a temperature control period, a temperature adjustment unit 606 determines the duty cycle such that the temperature detected by the temperature sensors 131 and 132 approaches the target temperature. The duty cycle of the heaters 341 and 346, which are responsible for heating the central region, may be determined based on the detection result from the temperature sensor 131. The duty cycle of the heaters 343, 344, and 345, which are responsible for heating the end regions, may be determined based on the detection result from the temperature sensor 132. The duty cycle of the heater 342, which is responsible for heating the end regions and the central region, may be determined based on an average value of the detection results from the temperature sensors 131 and 132. The setting unit 603 sets the duty cycle determined by the temperature adjustment unit 606 in the energization control unit 604. The energization control unit 604 executes energization control for the heaters 341 to 346 at the duty cycle determined by the temperature adjustment unit 606.

A timer 605 is used for monitoring each control period and for monitoring the energization start timing with respect to the zero-cross signal. A duty table 611 stored in memory 360 holds the duty cycle corresponding to the AC voltage (the maximum value, the effective value, or the nominal voltage). The determination unit 602 may determine the duty cycle by referring to the duty table 611 based on the AC voltage (the maximum value, the effective value, or the nominal voltage) obtained by the obtainment unit 601. Instead of the duty table 611, an arithmetic function may be used, taking the AC voltage (the maximum value, the effective value, or the nominal voltage) as an input and the duty cycle as an output. A temperature table 612 is used to determine the duty cycle from a different between the detection result of the fixing device 120 and the target temperature (a temperature difference). In other words, the temperature table 612 holds a correspondence relationship between the temperature difference and the duty cycle. The temperature adjustment unit 606 obtains the duty cycle corresponding to the temperature difference from the temperature table 612. Instead of the temperature table 612, an arithmetic function may be used, taking the temperature difference as an input and the duty cycle as an output. A period table 613 stores reduction control periods corresponding to AC voltages (the maximum value, the effective value, or the nominal voltage). The period table 613 will be described in detail in the second embodiment.

The duty table 611, the temperature table 612, and the period table 613 may be provided individually for the heaters 341 to 346. This is because, as illustrated in FIGS. 4A and 4B, the heat generation abilities of the heaters 341 to 346 are different from each other. In other words, the duty cycles and the reduction control periods for the heaters 341 to 346 may be different for the same voltage information.

Flowcharts

Figure 7:
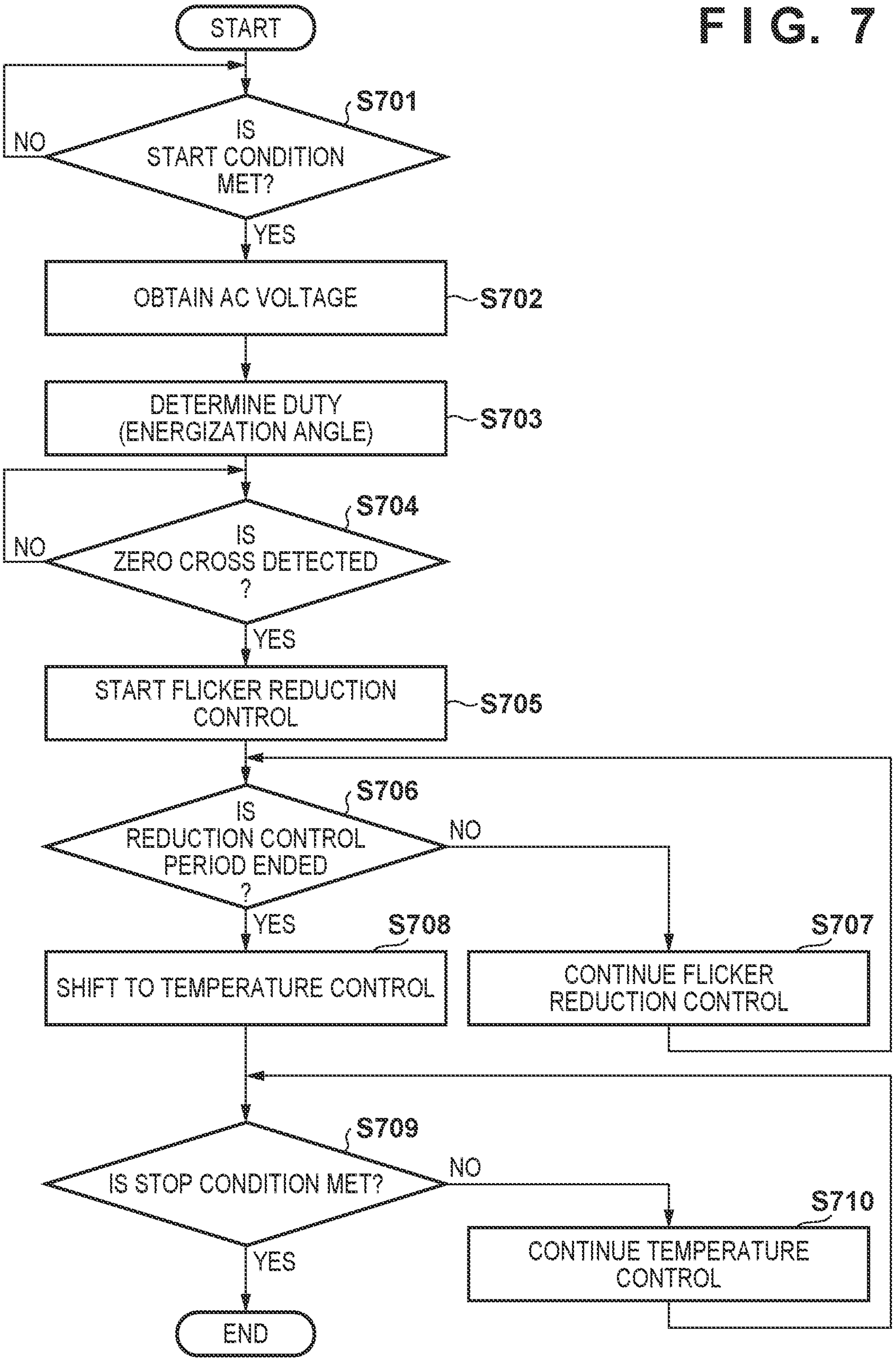
FIG. 7 is a flowchart illustrating flicker reduction control.

FIG. 7 is a flowchart illustrating an energization control method of the fixing device 120. When the image forming apparatus 100 starts up, the CPU 350 executes the following processing according to a control program. Although the energization control method for the heater 341 is described here, the same energization control method is applied to each of heaters 342 to 346.

In step S701, the CPU 350 determines whether a start condition has been met. The “start condition” is a condition for starting the heating of the fixing device 120. The start condition is, for example, that the image forming apparatus 100 has started up, that a print job has been received from the operation unit 390 or a host computer, or the like. If the start condition is met, the CPU 350 moves the sequence to step S702. If the start condition is not met, the CPU 350 (the energization control unit 604) outputs the control signal 331 to the switch 321 such that the switch 321 is turned off.

In step S702, the CPU 350 (the obtainment unit 601) obtains the AC voltage (the maximum value, the effective value, or the nominal voltage) of the first commercial power source 151 that supplies power to the heater 341. For example, the obtainment unit 601 obtains the AC voltage (the maximum value, the effective value, or the nominal voltage) based on the detection signal of the voltage detection circuit 301. Alternatively, the obtainment unit 601 may obtain the AC voltage (the maximum value, the effective value, or the nominal voltage) based on information input through the operation unit 390. The nominal voltage may be referred to as a “nominal value”. The maximum value or the effective value may be referred to as a “measured value” or an “actual value”.

In step S703, the CPU 350 (the determination unit 602) determines the duty cycle (the energization angle) to be applied to the heater 341 during the reduction control period. The determination unit 602 determines the duty cycle based on the AC voltage (the maximum value, the effective value, or the nominal voltage) obtained by the obtainment unit 601. The setting unit 603 sets the determined duty cycle in the energization control unit 604.

In step S704, the CPU 350 (the energization control unit 604) determines whether a zero cross has been detected. The energization control unit 604 detects the zero cross based on the zero-cross signal output from the voltage detection circuit 301. If a zero cross is detected, the CPU 350 moves the sequence to step S705.

In step S705, the CPU 350 (the energization control unit 604) starts flicker reduction control. As a result, inrush current is reduced, and flicker is reduced as well. The energization control unit 604 turns the switch 321 on at an energization start timing (e.g., time t2) delayed by a predetermined time from the timing at which the zero cross was detected (e.g., time t0). The predetermined time is determined based on the duty cycle. In the example in FIG. 5A, the predetermined time is the difference between the zero cross cycle and the duty cycle. The energization control unit 604 determines whether the energization start timing has arrived by monitoring the predetermined time using the timer 605.

In step S706, the CPU 350 (the setting unit 603) determines whether the reduction control period has ended. In the first embodiment, the reduction control period is a fixed value stored in the memory 360. The setting unit 603 determines whether the reduction control period has ended using the timer 605. If the reduction control period has not ended, the CPU 350 moves the sequence to step S707.

In step S707, the CPU 350 (the energization control unit 604) continues the flicker reduction control. On the other hand, if the reduction control period has ended, the CPU 350 moves the sequence to step S708.

In step S708, the CPU 350 (the setting unit 603) shifts the control of the fixing device 120 from flicker reduction control (the reduction control mode) to temperature control (the temperature control mode). In the temperature control mode, the temperature adjustment unit 606 determines the duty cycle corresponding to the difference between the temperature obtained by the temperature sensor 131 and the target temperature. The setting unit 603 sets the duty cycle determined by the temperature adjustment unit 606 in the energization control unit 604.

In step S709, the CPU 350 (the setting unit 603) determines whether a stop condition has been met. The stop condition is a condition for stopping the supply of power to the fixing device 120. The stop condition is, for example, that the CPU 350 starts the timer 605 at the timing when the image forming apparatus 100 finished forming an image (finished a print job). If the next print job is not submitted before the timer 605 has measured a predetermined time (i.e., if the timer 605 times out), the setting unit 603 sets the duty cycle to zero. This causes the fixing device 120 to transition from an operating state to a power-saving state. On the other hand, if the stop condition is not met, the CPU 350 moves the sequence to step S710.

In step S710, the CPU 350 (the energization control unit 604) continues the temperature control. In other words, the temperature adjustment unit 606 determines the duty cycle corresponding to the difference between the temperature obtained by the temperature sensor 131 and the target temperature. The setting unit 603 sets the duty cycle determined by the temperature adjustment unit 606 in the energization control unit 604. The energization control unit 604 turns the switch 321 on/off at the duty cycle determined by the temperature adjustment unit 606. This keeps the temperature of the fixing device 120 at the target temperature.

In this manner, according to the first embodiment, the duty cycle is determined according to the AC voltage (the voltage value) of the AC power source. If the AC voltage is high, a smaller duty cycle is set. If the AC voltage is low, a greater duty cycle is set. Accordingly, efficient heating is achieved while reducing flicker according to the effective value of the AC voltage. The effective value of the AC voltage, the maximum value of the AC voltage, and the nominal value (nominal voltage) are correlated with each other. Accordingly, either the effective value, the maximum value, or the nominal voltage of the AC voltage may be used to determine the duty cycle. However, if the actual value of the effective value or the maximum value of the AC voltage is used, the duty cycle can be determined with good accuracy, even in areas where the nominal voltage deviates from the effective value or the maximum value.

In the first embodiment, there are two power supply systems, and thus the duty cycle is determined for each power supply system. However, the technical spirit of the first embodiment can also be applied to cases where the fixing device 120 is connected to a single power supply system. In this case, each duty cycle of the heaters 341 to 346 is determined based on the AC voltage of the single power supply system.

Although the six heaters 341 to 346 are given as an example in the first embodiment, the technical spirit of the first embodiment does not depend on the number of heaters. In other words, the first embodiment is applicable to a single heater as well. In FIG. 5C, the maximum value is detected as the actual value of the AC voltage, but this is merely one example. The effective value or an average value may be measured instead of the maximum value.

In the first embodiment, the duty cycle is constant during the reduction control period. However, the duty cycle may be variably controlled. For example, the duty cycle may be gradually increased during the reduction control period. Doing so reduces the heating time. The reduction control period may be called a "slow-start period" or a "soft-start period".

Second Embodiment

In the first embodiment, the duty cycle of each heater is set according to the AC voltage. However, this is merely one example. The reduction control period may be set according to the AC voltage, which reduces inrush current, and results in reduced flicker. Specifically, the reduction control period for the first heater group 361 is set according to the AC voltage (the maximum value, the effective value, or the nominal voltage) of the first commercial power source 151. The reduction control period for the second heater group 362 is set according to the AC voltage (the maximum value, the effective value, or the nominal voltage) of the second commercial power source 152. In the second embodiment, the descriptions in the first embodiment will be used for descriptions of matters that are the same as, or similar to, those in the first embodiment.

Figure 8A:
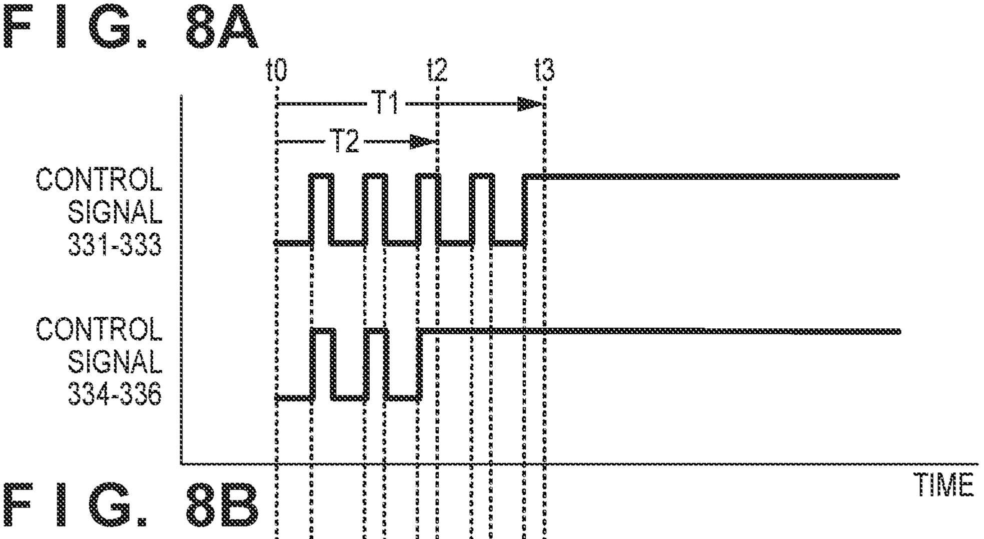
FIGS. 8A to 8D are diagrams illustrating flicker reduction control in a second embodiment.
Figure 8B:
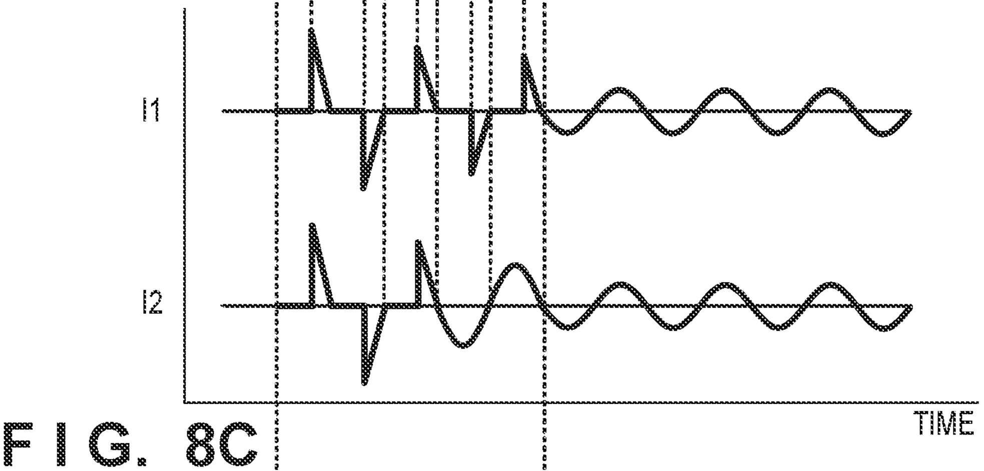
Figure 8C:
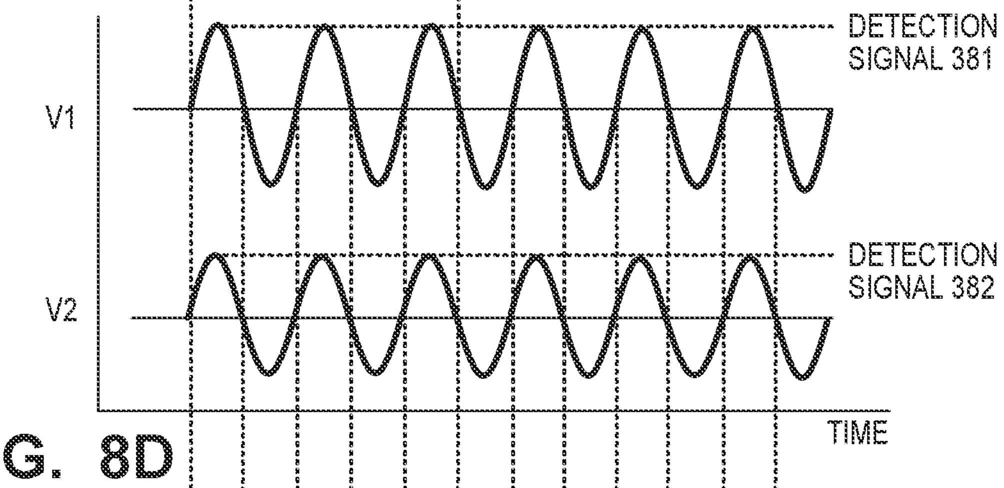
Figure 8D:
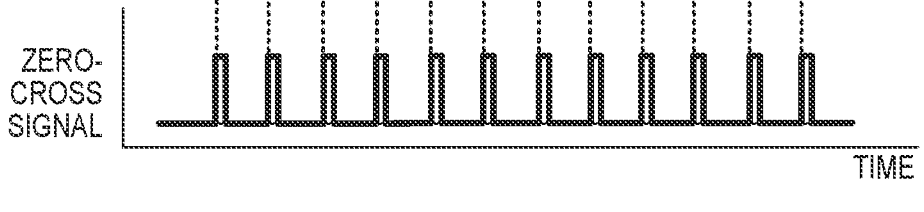

FIG. 8A illustrates changes in the control signals 331 to 336. FIG. 8B illustrates changes in the input current I1 from the first commercial power source 151 and changes in the input current I2 from the second commercial power source 152. FIG. 8C illustrates changes in the input voltage V1 from the first commercial power source 151 and changes in the input voltage V2 from the second commercial power source 152. Here, the maximum value of the input voltage V1 is greater than the maximum value of the input voltage V2. In other words, the nominal voltage (effective value) of the first commercial power source 151 is higher than the nominal voltage (effective value) voltage of the second commercial power source 152. FIG. 8D illustrates the zero-cross signals for the first commercial power source 151 and the second commercial power source 152.

As illustrated in FIG. 8A, the reduction control period for the first heater group 361 is T1. The reduction control period for the second heater group 362 is T2. The reduction control period T1 is determined, for example, based on the detection signal 381 indicated in FIG. 8C. The reduction control period T2 is determined, for example, based on the detection signal 382 indicated in FIG. 8C. As illustrated in FIG. 8C, the input voltage V1 from the first commercial power source 151 is higher than the input voltage V2 from the second commercial power source 152. Therefore, the reduction control period 12 for the second heater group 362 is shorter than the reduction control period T1 for the first heater group 361. In other words, the reduction control period 12 for the second heater group 362 is shorter, which makes it possible for the amount of power supplied to the second heater group 362 to be increased more quickly. This reduces the heating time required for the temperature of the fixing device 120 to reach the target temperature.

As illustrated in FIG. 8B, the duty cycle applied to the first heater group 361 in the reduction control period T1 is equal to the duty cycle applied to the second heater group 362 in the reduction control period T2. This is because flicker is reduced by the reduction control periods T1 and T2.

As illustrated in FIG. 8A, the reduction control period T1 is a period from time t0 to time t3. The reduction control period T2 is a period from time t0 to time t2. The energization control unit 604 starts the reduction control based on the timing of the rising edge of the zero-cross signal (time t0). The energization control unit 604 controls the duty cycle in each cycle of the reduction control periods T1 and T2 to a constant value.

Flowcharts

Figure 9:
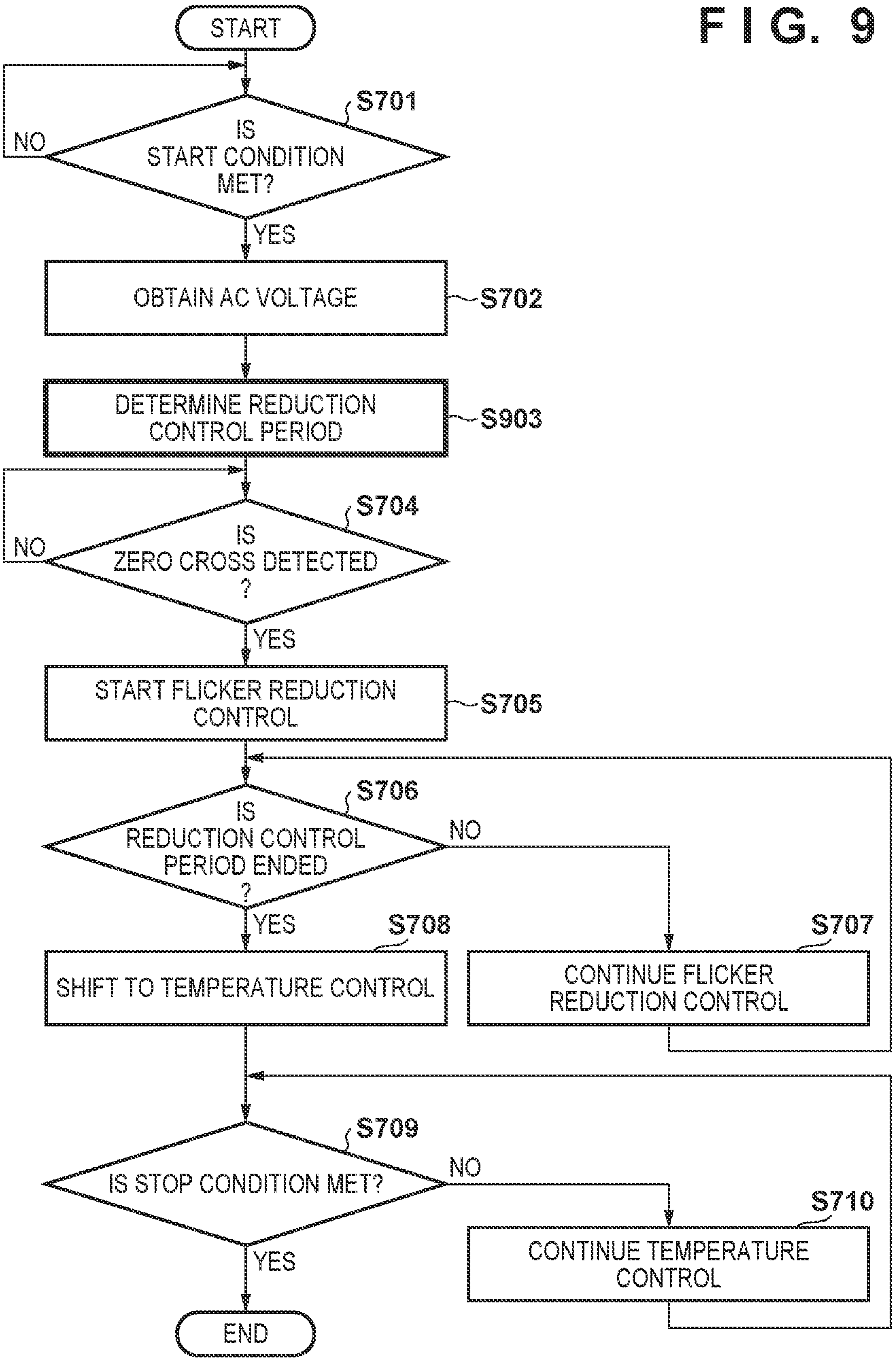
FIG. 9 is a flowchart illustrating a control method according to the second embodiment.

FIG. 9 is a flowchart illustrating an energization control method of the fixing device 120. When the image forming apparatus 100 starts up, the CPU 350 executes the following processing according to a control program. Although the energization control method for the heater 341 is described here, the same energization control method is applied to each of heaters 342 to 346. The second embodiment differs from the first embodiment in that the reduction control periods T1 and T2 are variable according to the AC voltage, and that an initial value of the duty cycle in the reduction control periods T1 and T2 is constant. Therefore, FIG. 9 differs in that step S703 is replaced by step S903. The following descriptions will therefore focus on step S903.

In step S903, the CPU 350 (the determination unit 602) determines the reduction control period T1 based on the AC voltage (the maximum value, the effective value, or the nominal voltage) obtained by the obtainment unit 601. Voltage information indicating the AC voltage is obtained through the voltage detection circuit 301 or the operation unit 390. Note that the voltage information used to determine the reduction control period T2 is obtained from the voltage detection circuit 302 or the operation unit 390. The determination unit 602 may determine the reduction control periods T1 and T2 corresponding to the voltage information by referring to the period table 613 stored in the memory 360. Alternatively, an arithmetic function may be used, taking the voltage information as an input and the reduction control periods T1 and T2 as an output. The setting unit 603 sets the reduction control periods T1 and T2 in the energization control unit 604. In the subsequent step S706, the reduction control periods T1 and T2 determined and set in step S903 are monitored.

In the second embodiment, the duty cycle in the reduction control periods T1 and T2 is maintained constant with respect to the voltage of the commercial AC power source, and only the reduction control periods T1 and T2 are variable, but this is merely one example. The variable duty cycle control described in the first embodiment may be combined with the second embodiment. In other words, the duty cycles in the reduction control periods T1 and T2, and both the reduction control periods T1 and T2, may be determined according to the voltage of the commercial AC power source. In other words, the duty cycle may be a constant value determined according to the voltage of the commercial AC power source. The duty cycle in the reduction control periods T1 and T2 may be controlled in a variable manner. For example, the duty cycle may be gradually increased from the initial value during the reduction control periods T1 and T2. However, the initial value is determined according to the voltage of the commercial AC power source, as described in the first embodiment.

Although there are two power supply systems here, i.e., the first commercial power source 151 and the second commercial power source 152, this is merely one example. The second embodiment is also applicable when power is supplied to the heaters 341 to 346 from a single power supply system. In other words, the reduction control periods T1 and T2 may be determined according to the voltage information of a single power supply system. However, in this case, T1=T2. Although the six heaters 341 to 346 are described as an example here, the second embodiment can be applied as long as there is at least one heater. In FIG. 8C, the maximum value of the AC voltage is used as the voltage information, but the effective value, an average value, the nominal voltage, or the like may be used, as described above.

Technical Spirit Derived from Embodiments

Aspects 1 and 16

The voltage detection circuit 301, the operation unit 390, and the obtainment unit 601 are examples of a first obtainment unit for obtaining first voltage information indicating a voltage value of AC voltage supplied from a first AC power source. Note that the voltage detection circuit 301, the operation unit 390, and the obtainment unit 601 are a type of input circuit. The fixing device 120 is an example of a fixing unit that includes a first heater that generates heat by power supplied from the first AC power source and that fixes a toner image to a sheet using the heat. The switch 321 is an example of a first switch provided between the first AC power source and the first heater. The CPU 350 is an example of a control unit that controls the first switch such that the power from the first AC power source is intermittently supplied to the first heater from a timing at which the supply of power from the first AC power source to the first heater is started until a timing at which a first predetermined time elapses. Additionally, the CPU 350 is an example of a control unit that executes energization control which suppresses a flow of inrush current from the first AC power source to the first heater for the first predetermined time after the supply of power from the first AC power source to the first heater is started. As described in the first embodiment, the CPU 350 may determine an on time (e.g., the duty cycle) of the first switch per half cycle of AC from the first AC power source applied to the first switch in the first predetermined time based on the first voltage information. As described in the second embodiment, the CPU 350 may determine the length of the first predetermined time (the reduction control period T1) based on the first voltage information. Alternatively, the CPU 350 may determine both the on time (e.g., the duty cycle) of the first switch and the length of the first predetermined time (the reduction control period T1) based on the first voltage information. Through this, efficient heating is achieved while reducing flicker according to the effective value of the AC voltage.

Aspect 2

The voltage detection circuit 302, the operation unit 390, and the obtainment unit 601 are examples of a second obtainment unit for obtaining second voltage information indicating a voltage value of AC voltage supplied from a second AC power source. The heater 344 is an example of a second heater that is provided in the fixing unit and that generates heat by power supplied from the second AC power source. The switch 324 is an example of a second switch provided between the second AC power source and the second heater. The CPU 350 executes energization control which suppresses a flow of inrush current from the second AC power source to the second heater for a second predetermined time after the supply of power from the second AC power source to the second heater is started. The CPU 350 may determine the on time of the second switch per half cycle of AC from the second AC power source applied to the second switch in the second predetermined time based on the second voltage information. The CPU 350 may determine the length of the second predetermined time (e.g., the reduction control period T2) based on the second voltage information. Furthermore, the CPU 350 may determine both the on time (e.g., the duty cycle) of the second switch and the length of the second predetermined time (the reduction control period T2) based on the second voltage information. In this manner, even in cases where power is supplied to a plurality of heaters from a plurality of AC power sources, efficient heating is achieved while reducing flicker according to the voltage values (effective values or the like) of the AC voltages. By doing so, the length of the reduction control period T2 maintains a length based on the AC voltage of the second AC power source, and thus the time required to control the temperature of the fixing device 120 to the target temperature is reduced. Aspect 2 is combined with Aspect 1.

Aspects 3 and 4

The first voltage information may include one of a maximum value, an effective value, an average value, or a nominal value of the AC voltage supplied from the first AC power source. The second voltage information may include one of a maximum value, an effective value, an average value, or a nominal value of the AC voltage supplied from the second AC power source. In particular, when the actual values from the voltage detection circuits 301 and 302 are used, it is possible to adjust the length of the reduction control period or the duty cycle in the reduction control period even for short-term fluctuations in the AC power source. A nominal voltage input by the user may be used if the short-term AC voltage fluctuations are small. For example, if an AC voltage of 240 V, which is the nominal voltage, is stably supplied, 240 V may be used as the voltage information. Alternatively, if the voltage (effective value) of the first AC power source is 264 V (the nominal voltage+10%) and the voltage (effective value) of the second AC power source is 216 V (the nominal voltage−10%), the duty cycle and the reduction control period may be determined according to each voltage (actual value). Aspect 3 may be combined with Aspect 1 or 2. Aspect 4 may be combined with Aspect 2.

Aspect 5

As illustrated in FIG. 5A, the duty cycle of the first heater and the duty cycle of the second heater are different, and thus the timing when the first heater turns on and the timing when the second heater turns on may be staggered. Alternatively, even if the duty cycle of the first heater and the duty cycle of the second heater are the same, the timing when the first heater turns on and the timing when the second heater turns on may be staggered. For example, if the first AC power source and the second AC power source are the same AC power source, power is supplied to the first heater and the second heater from a single AC power source. When the first heater and the second heater turn on simultaneously, a voltage drop in the single AC power source increases, and flicker increases as a result. Here, the flicker increasing refers to an increase in flicker perceived by humans. Therefore, the timing when the first heater turns on and the timing when the second heater turns on are staggered, which reduces flicker. Aspect 5 may be combined with Aspect 2 or 4.

Aspects 6 to 9

The temperature sensors 131 and 132 function as a detection unit for detecting the temperature of the fixing unit. A control mode that determines the on time of the first switch per half cycle of AC from the first AC power source based on the first voltage information may be called a "reduction control mode". In the reduction control mode, the first switch is turned on for a time shorter than the half cycle of AC (an on time). A control mode that determines the on time of the first switch per half cycle of AC from the first AC power source based on a detection result from the fixing unit may be called a "temperature control mode". As described in the first embodiment, in the reduction control mode, the on time of the first switch may be constant. The CPU 350 may gradually increase the on time of the first switch from an initial value in the reduction control mode. Here, the initial value may be determined based on the first voltage information. The on time of the first switch in the reduction control mode may have a negative correlation with a peak value (maximum value) or the effective value of the AC voltage from the first AC power source. In other words, the higher the effective value of the AC voltage from the first AC power source, the more likely it is that a large inrush current will be produced. Therefore, by determining the on time of the first switch to be negatively correlated with the effective value of the AC voltage, inrush current is reduced, and flicker is reduced as well. Aspect 6 may be combined with Aspects 1 to 5. Aspects 7 and 8 may be combined with Aspect 6. Aspect 9 may be combined with Aspects 6 to 8.

Aspects 10 and 11

A resistance value of the first heater may increase in correlation with the temperature of the first heater. In other words, it is necessary to reduce the inrush current during periods when the temperature of the first heater is low. The first heater may be a halogen heater. Note that this embodiment is expected to be useful if the resistance value of the heater is correlated with the temperature of the heater. In other words, this embodiment is effective for heaters other than halogen heaters as well. Aspect 10 may be combined with Aspects 1 to 9. Aspect 11 may be combined with Aspects 1 to 10.

Aspect 12

The heater 342 is an example of a third heater that is provided in the fixing unit and that generates heat by power supplied from the first AC power source. The switch 322 is an example of a third switch provided between the first AC power source and the third heater. The CPU 350 executes energization control which suppresses a flow of inrush current from the first AC power source to the third heater for a third predetermined time after the supply of power from the first AC power source to the third heater is started. The CPU 350 may determine at least one of the on time of the third switch per half cycle of AC from the first AC power source applied to the third switch in the third predetermined time and the length of the third predetermined time based on the first voltage information. Aspect 12 may be combined with Aspects 1 to 11.

Aspect 13

The heater 343 is an example of a fourth heater that is provided in the fixing unit and that generates heat by power supplied from the first AC power source. The switch 323 is an example of a fourth switch provided between the first AC power source and the fourth heater. The CPU 350 executes energization control which suppresses a flow of inrush current from the first AC power source to the fourth heater for a fourth predetermined time after the supply of power from the first AC power source to the fourth heater is started. The CPU 350 may determine at least one of the on time of the third switch per half cycle of AC from the first AC power source applied to the fourth switch in the fourth predetermined time and the length of the fourth predetermined time based on the first voltage information. Aspect 13 may be combined with Aspects 1 to 12.

Aspect 14

The heater 345 is an example of a fifth heater that is provided in the fixing unit and that generates heat by power supplied from the second AC power source. The switch 325 is an example of a fifth switch provided between the second AC power source and the fifth heater. The CPU 350 executes energization control which suppresses a flow of inrush current from the second AC power source to the fifth heater for a fifth predetermined time after the supply of power from the second AC power source to the fifth heater is started. The CPU 350 may determine at least one of the on time of the third switch per half cycle of AC from the second AC power source applied to the fifth switch in the fifth predetermined time and the length of the fifth predetermined time based on the second voltage information. Aspect 14 may be combined with Aspect 2, 4, or 5.

Aspect 15

The heater 346 is an example of a sixth heater that is provided in the fixing unit and that generates heat by power supplied from the second AC power source. The switch 326 is an example of a sixth switch provided between the second AC power source and the sixth heater. The CPU 350 executes energization control which suppresses a flow of inrush current from the second AC power source to the sixth heater for a sixth predetermined time after the supply of power from the second AC power source to the sixth heater is started. The CPU 350 may determine at least one of the on time of the third switch per half cycle of AC from the second AC power source applied to the sixth switch in the sixth predetermined time and the length of the sixth predetermined time based on the second voltage information. Aspect 14 may be combined with Aspect 2, 4, 5, or 14.

Aspect A1

An image forming apparatus comprising:
- an image forming unit configured to form an image on a sheet;
- a fixing unit configured to fix the image to the sheet, the fixing unit including:
  - a first heater to which a first current is supplied from a first commercial power source to generate heat;
  - a first switch provided in a current line between the first commercial power source and the first heater and configured to switch whether or not to supply the first current to the first heater;
  - a second heater to which a second current is supplied from a second commercial power source to generate heat, the second commercial power source being different from the first commercial power source;
  - a second switch provided in a current line between the second commercial power source and the second heater and configured to switch whether or not to supply the second current to the second heater; and
  - a temperature sensor configured to detect a temperature of the fixing unit; and
- a controller configured to:
  - obtain information related to a first AC voltage supplied from the first commercial power source;
  - obtain information related to a second AC voltage supplied from the second commercial power source;
  - determine, based on the information related to the first AC voltage, a first duty cycle of the first current to be supplied to the first heater;
  - determine, based on the information related to the second AC voltage, a second duty cycle of the second current to be supplied to the second heater;
  - control the first switch based on the first duty cycle in a reduction control period;
  - control the second switch based on the second duty cycle in the reduction control period; and
  - control the first switch and the second switch after the reduction control period, such that the temperature of the fixing unit detected by the sensor maintains a target temperature for fixing the image by the fixing unit.

Aspect A2

The image forming apparatus according to Aspect A1, wherein
- the information related to the first AC voltage includes a maximum value of the AC voltage supplied from the first commercial power source, and
- the information related to the second AC voltage includes a maximum value of the AC voltage supplied from the second commercial power source.

Aspect A3

The image forming apparatus according to Aspect A1, wherein
- the information related to the first AC voltage includes an effective value of the AC voltage supplied from the first commercial power source, and
- the information related to the second AC voltage includes an effective value of the AC voltage supplied from the second commercial power source.

Aspect A4

The image forming apparatus according to Aspect A1, wherein
- the information related to the first AC voltage includes an average value of the AC voltage supplied from the first commercial power source, and
- the information related to the second AC voltage includes an average value of the AC voltage supplied from the second commercial power source.

Aspect A5

The image forming apparatus according to Aspect A1, wherein
- the information related to the first AC voltage includes a nominal value of the AC voltage supplied from the first commercial power source, and
- the information related to the second AC voltage includes a nominal value of the AC voltage supplied from the second commercial power source.

Aspect A6

The image forming apparatus according to Aspect A1, wherein
- the controller controls the first switch and the second switch, in the reduction control period, such that a timing at which the first switch switches from an off state, in which the first current is cut off, to an on state, in which the first current is supplied, and a timing at which the second switch switches from an off state, in which the second current is cut off, to an on state, in which the second current is supplied, do not occur simultaneously.

Aspect A7

The image forming apparatus according to Aspect A1, wherein the first duty cycle is a constant value, and the second duty cycle is a constant value different from the first duty cycle.

Aspect A8

The image forming apparatus according to Aspect A1, wherein in the reduction control period, the controller increases a time for which the first switch is on based on the first duty cycle, and in the reduction control period, the controller increases a time for which the second switch is on based on the second duty cycle.

Aspect A9

The image forming apparatus according to Aspect A1, wherein the fixing unit further includes a third heater to which a third current is supplied from the first commercial power source to generate heat, and a fourth heater to which a fourth current is supplied from the second commercial power source to generate heat.

Aspect A10

An image forming apparatus comprising:

an image forming unit that forms an image on a sheet;

a fixing unit that fixes the image to the sheet, the fixing unit including:

a first heater to which a first current is supplied from a first commercial power source to generate heat;

a first switch that is provided in a current line between the first commercial power source and the first heater and that switches whether or not to supply the first current to the first heater;

a second heater to which a second current is supplied from a second commercial power source to generate heat, the second commercial power source being different from the first commercial power source;

a second switch that is provided in a current line between the second commercial power source and the second heater and that switches whether or not to supply the second current to the second heater; and a temperature sensor that detects a temperature of the fixing unit; and a controller configured to:

obtain information related to a first AC voltage supplied from the first commercial power source;

obtain information related to a second AC voltage supplied from the second commercial power source;

determine, based on the information related to the first AC voltage, a first reduction control period in which the first current to be supplied to the first heater is reduced after power starts being supplied to the first heater;

determine, based on the information related to the second AC voltage, a second reduction control period in which the second current to be supplied to the second heater is reduced after power starts being supplied to the second heater;

control the first switch based on a first duty cycle in the first reduction control period;

control the second switch based on a second duty cycle in the second reduction control period, the second duty cycle being different from the first duty cycle;

control the first switch after the first reduction control period, such that the temperature of the fixing unit detected by the sensor maintains a target temperature at which the fixing unit is capable of fixing the image; and control the second switch after the second reduction control period, such that the temperature of the fixing unit detected by the sensor maintains a target temperature at which the fixing unit is capable of fixing the image.

Aspect A11

The image forming apparatus according to Aspect A10, wherein the information related to the first AC voltage includes a maximum value of the AC voltage supplied from the first commercial power source, and the information related to the second AC voltage includes a maximum value of the AC voltage supplied from the second commercial power source.

Aspect A12

The image forming apparatus according to Aspect A10, wherein the information related to the first AC voltage includes an effective value of the AC voltage supplied from the first commercial power source, and the information related to the second AC voltage includes an effective value of the AC voltage supplied from the second commercial power source.

Aspect A13

The image forming apparatus according to Aspect A10, wherein the information related to the first AC voltage includes an average value of the AC voltage supplied from the first commercial power source, and the information related to the second AC voltage includes an average value of the AC voltage supplied from the second commercial power source.

Aspect A14

The image forming apparatus according to Aspect A10, wherein the first duty cycle is a constant value, and the second duty cycle is a constant value different from the first duty cycle.

Aspect A15

The image forming apparatus according to Aspect A10, wherein in the first reduction control period, the controller gradually increases the first duty cycle, and in the second reduction control period, the controller gradually increases the second duty cycle.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-120809 filed Jul. 21, 2021 which is hereby incorporated by reference herein in its entirety.

What is claimed is:

1. An image forming apparatus comprising:

an image forming unit configured to form an image on a sheet;

a fixing unit configured to fix the image to the sheet, the fixing unit including:

a first heater to which a first current is supplied from a first commercial power source to generate heat;

a second heater to which a second current is supplied from a second commercial power source to generate heat, the second commercial power source being different from the first commercial power source;

a third heater connected to the first commercial power source; and a fourth heater connected to the second commercial power source; and a controller configured to:

obtain a first AC voltage value supplied from the first commercial power source; and obtain a second AC voltage value supplied from the second commercial power source;

wherein the controller is further configured to determine a heating duty of the first heater when the first heater is firstly turned on after power of the image forming apparatus is turned on, based on the first AC voltage value, wherein the controller is further configured to determine a heating duty of the second heater when the second heater is firstly turned on after the power of the image forming apparatus is turned on, based on the second AC voltage value, and wherein in a width direction of a recording material, a light distribution at a center of the first heater is higher than a light distribution at an end of the first heater, in the width direction, a light distribution at an end of the second heater is higher than a light distribution at a center of the second heater, in the width direction, a light distribution at an end of the third heater is higher than a light distribution at a center of the third heater, and in the width direction, a light distribution at a center of the fourth heater is higher than a light distribution at an end of the fourth heater.

2. The image forming apparatus according to claim 1, wherein the first AC voltage includes a maximum value of the AC voltage supplied from the first commercial power source, and the second AC voltage includes a maximum value of the AC voltage supplied from the second commercial power source.

3. The image forming apparatus according to claim 1, wherein the first AC voltage includes an effective value of the AC voltage supplied from the first commercial power source, and the second AC voltage includes an effective value of the AC voltage supplied from the second commercial power source.

4. The image forming apparatus according to claim 1, wherein the first AC voltage includes an average value of the AC voltage supplied from the first commercial power source, and the second AC voltage includes an average value of the AC voltage supplied from the second commercial power source.

5. The image forming apparatus according to claim 1, wherein the first AC voltage includes a nominal value of the AC voltage supplied from the first commercial power source, and the second AC voltage includes a nominal value of the AC voltage supplied from the second commercial power source.

6. The image forming apparatus according to claim 1, further comprising:

a first switch provided in a current line between the first commercial power source and the first heater and configured to switch whether or not to supply the first current to the first heater; and a second switch provided in a current line between the second commercial power source and the second heater and configured to switch whether or not to supply the second current to the second heater.

7. The image forming apparatus according to claim 1, further comprising a temperature sensor configured to detect a temperature of the fixing unit, wherein the controller is further configured to, in a case where the fixing unit is fixing a recording material, determine the duty of the first heater and the duty of the second heater based on a sensing result of the temperature sensor.

8. The image forming apparatus according to claim 1, further comprising a fifth heater connected to the first commercial power source, wherein in the width direction, a light distribution at a center of the fifth heater is equal to a light distribution at an end of the fifth heater, and heaters connected to the first commercial power source do not include a heater of which light distribution at a center of the heater is equal to a light distribution at an end of the heater.

9. The image forming apparatus according to claim 1, wherein a number of heaters connected to the first commercial power source is equal to a number of heaters connected to the second commercial power source.

* * * * *